United States Patent
Drejak

(10) Patent No.: US 11,423,560 B2
(45) Date of Patent: Aug. 23, 2022

(54) METHOD FOR IMPROVING THE INTERPRETATION OF THE SURROUNDINGS OF A VEHICLE

(71) Applicant: Everdrone AB, Askim (SE)

(72) Inventor: Maciek Drejak, Västra Frölunda (SE)

(73) Assignee: Everdrone AB, Askim (SE)

( * ) Notice: Subject to any disclaimer, the term of this patent is extended or adjusted under 35 U.S.C. 154(b) by 201 days.

(21) Appl. No.: 16/918,024

(22) Filed: Jul. 1, 2020

(65) Prior Publication Data
US 2021/0004977 A1    Jan. 7, 2021

(30) Foreign Application Priority Data
Jul. 5, 2019 (EP) .................................. 19184606

(51) Int. Cl.
 *G06T 7/55* (2017.01)
 *B64C 39/02* (2006.01)
 (Continued)

(52) U.S. Cl.
CPC .............. *G06T 7/55* (2017.01); *B64C 39/024* (2013.01); *B64D 47/08* (2013.01); *G06V 10/751* (2022.01);
(Continued)

(58) Field of Classification Search
CPC .............. G06T 7/55; G06T 2207/10032; G06T 2207/30168; G06T 7/593; B64C 39/024;
(Continued)

(56) References Cited

U.S. PATENT DOCUMENTS 9,396,400 B1    7/2016  Teichman et al.
9,826,202 B2   11/2017  Eline et al.
(Continued)

FOREIGN PATENT DOCUMENTS

CN   103839258  *  6/2014  .......... G06K 9/2036
CN   108389258  *  6/2014  ............ G06T 17/20
(Continued)

OTHER PUBLICATIONS

Communication pursuant to Article 94(3) for European Patent Application No. 19184606.2, dated Jun. 9, 2020, 6 pages.
(Continued)

*Primary Examiner* — Jerome Grant, II
(74) *Attorney, Agent, or Firm* — Buchanan Ingersoll & Rooney P.C.

(57) ABSTRACT

The present invention relates to a computer-implemented method for improving the interpretation of the surroundings of a vehicle (100), wherein the method comprises: receiving a source image (14) of a surrounding environment (118) of the vehicle, which source image is captured by a sensor unit (12*a*) of the vehicle; receiving or computing a depth data image (20) comprising depth data based on the source image and at least one more source image; detecting a repetitive pattern (30) in the received source image; and based on the detection of the repetitive pattern, determining that an area (32) of the depth data image, which area (32) corresponds to an area (34) of the detected repetitive pattern in the received source image, contains unreliable depth data.

20 Claims, 5 Drawing Sheets

(51) Int. Cl.
  *B64D 47/08* (2006.01)
  *G06V 10/75* (2022.01)

(52) U.S. Cl.
  CPC .. *B64C 2201/027* (2013.01); *B64C 2201/127* (2013.01); *G06T 2207/10032* (2013.01); *G06T 2207/30168* (2013.01); *G06V 10/759* (2022.01)

(58) Field of Classification Search
  CPC ........ B64C 2201/027; B64C 2201/127; B64D 47/08; G06V 10/751; G06V 10/759; G06V 10/98; G06V 20/13; G06V 20/17; G06V 20/56
  USPC ......................................................... 382/104
  See application file for complete search history.

(56) References Cited

U.S. PATENT DOCUMENTS

| | | |
|---|---|---|
| 2013/0106849 A1 | 5/2013 | Ha et al. |
| 2013/0176487 A1 | 7/2013 | Nakashima |
| 2014/0055560 A1 | 2/2014 | Fu et al. |
| 2014/0240469 A1 | 8/2014 | Lee |
| 2014/0241614 A1 | 8/2014 | Lee |
| 2016/0219223 A1 | 7/2016 | Eline |
| 2016/0300361 A1 | 10/2016 | Xie |
| 2017/0150053 A1 | 5/2017 | Eline |
| 2018/0025505 A1 | 1/2018 | Huang |
| 2018/0184070 A1 | 6/2018 | Nash |
| 2019/0035099 A1 | 1/2019 | Ebrahimi Afrouzi |
| 2019/0206073 A1 | 7/2019 | Huang |
| 2019/0236764 A1 | 8/2019 | Lindsey |
| 2019/0311637 A1 | 10/2019 | Drejak |
| 2021/0004977 A1 | 1/2021 | Drejak |

FOREIGN PATENT DOCUMENTS

| | | | | |
|---|---|---|---|---|
| CN | 108267097 | * | 7/2018 | ........... G01B 11/254 |
| CN | 109618108 | * | 4/2019 | ........... H04N 5/2323 |
| CN | 109919992 | * | 6/2019 | ........... H04N 13/254 |
| EP | 3550506 A1 | | 10/2019 | |
| WO | WO2015098288 | * | 7/2015 | ........... H04N 13/204 |
| WO | 2017002367 A1 | | 1/2017 | |
| WO | WO20200186825 | * | 9/2020 | ............. G01B 11/22 |

OTHER PUBLICATIONS

Extended European Search Report for European Patent Application No. 19184606.2 dated Dec. 18, 2019, 10 pages.

Voronin V.V., et al., Depth Map Occlusion in Filling and Scene Reconstruction Using Modified Exemplar-based npainting. Image Processing: Algorithms and Systems XIII, SPIE-IS&T vol. 9399 93990S, 2015, 11 pages.

Extended European Search Report for European Patent Application No. 18165958.2-1210 dated Oct. 17, 2018, 9 pages.

* cited by examiner

METHOD FOR IMPROVING THE INTERPRETATION OF THE SURROUNDINGS OF A VEHICLE

TECHNICAL FIELD

The present invention relates to a (computer-implemented) method for improving the interpretation of the surroundings of a vehicle, such as an unmanned aerial vehicle (UAV). The present invention also relates to a computer program product, a computer-readable storage medium, an electrical signal, a sensor rig for improving the interpretation of the surroundings of a vehicle, and a vehicle comprising such a sensor rig.

BACKGROUND

Unmanned aerial vehicles (UAV), also known as drones, are aircrafts without a human pilot aboard the vehicle. There are several different types and sizes of UAVs, and they may be used in a number of different application areas. For example, UAVs may be used to deliver different types of goods, such as products that have been purchased online or medical equipment, e.g. defibrillators, to the scene of an accident. Other areas of use are also possible, such as surveillance and photography and inspection.

When using UAVs, especially in urban environments, safety is essential. If the UAV would crash or fail in navigating correctly over a crowded area, both property and humans may be endangered. Therefore, it is crucial that the UAVs do not fail during flight. UAVs typically comprise a number of different sensors to ensure a safe flight and to navigate. These sensors may capture an image of a surrounding environment, which image may suitably comprise depth data.

However, the images may sometimes comprise artefacts causing the UAV to receive an at least partly incorrect image of the surrounding environment which may disturb the performance of the UAV. This may also apply to other applications, such as other types of vehicles.

SUMMARY OF THE INVENTION

It is an object of the present invention to overcome or at least alleviate the aforementioned problem(s).

According to a first aspect of the present invention, this and other objects is achieved by a computer-implemented method for improving the interpretation of the surroundings of a vehicle, wherein the method comprises: receiving a source image of a surrounding environment of the vehicle, which source image is captured by a sensor unit of the vehicle; receiving or computing a depth data image comprising depth data based on the source image and at least one more source image; detecting a repetitive pattern in the received source image; and based on the detection of the repetitive pattern, determining that an area of the depth data image, which area corresponds to an area of the detected repetitive pattern in the received source image, contains unreliable depth data.

The steps of the method could be performed by a computer device of the vehicle. The method may be performed continuously/in real-time. The received source image of the surrounding environment and at least one more source image may for example be two offset two-dimensional images captured by two spaced-apart cameras of the sensor unit. The two images may be captured at an offset in position, i.e. the received source image may be offset in position (e.g. vertically or horizontally) with respect to the one more source image. Determining that the area of the depth data image contains unreliable depth data may for example include flagging that area and/or its depth data.

Repetitive patterns in the surroundings of the vehicle, for example stripes on an awning, can cause artefacts in the depth data image. The awning can for example appear much closer to the vehicle than what it actually is. To this end, the present invention is based on the understanding that the interpretation of the surroundings of the vehicle readily can be improved by determining (solely) based on detection of a repetitive pattern in the received source image that the corresponding area of the depth data image contains unreliable depth data. In other words, the method may determine that certain depth data in the depth data image are unreliable if their position in the depth data image coincide with the detected repetitive pattern in the received source image. Another advantage of the present invention is that it can handle both relatively small artefacts and relatively large artefacts.

The (detected) repetitive pattern may be repetitive along a direction which corresponds to an offset direction of said source image and said at least one more source image, because such a repetitive pattern can cause the aforementioned artefacts in the depth data image. The source image and the at least one more source image may for example be vertically offset due to vertically spaced-apart cameras of the sensor unit, wherein the repetitive pattern is repetitive, i.e. contains repetition, along the vertical direction. Any other repetitive pattern in the received source image, e.g. a pattern which is repetitive along the horizontal direction using the above example, may not be detected and/or cause depth data to be determined as unreliable by the present method.

Furthermore, the distance between repeated elements of the (detected) repetitive pattern as imaged in the received source image may substantially correspond to the disparity offset between the received source image and the one more source image. Such a repetitive pattern can in particular cause the aforementioned artefacts in the depth data image. The repeated elements may for example be the aforementioned stripes. 'substantially' may here be construed as +/−25% or +/−10%, for example. The 'disparity offset' may be defined as the pixel offset for a given point in the received source image to the corresponding point in the one more source image. For example, if an object in the received source image is at a pixel position 10;5 and the same object in the one more source image is at a pixel position 14;5, the disparity offset is 4 pixels. In at least one embodiment, the depth data will be determined as unreliable only if the above condition (claim 3) is met.

Detecting the repetitive pattern in the received source image may include performing block matching (solely) in the received source image. Block matching is for example known from stereo vision where it takes a small region of pixels in one image and searches for the closest matching region of pixels in another image, but here block matching is used to find at least two blocks of pixels in a single image (=the received source image) that at least closely match. In this way, the repetitive pattern can confidently be detected. The at least two blocks of pixels in the received source image may for example be matched using a sum of squared differences (SSD) method.

Furthermore, finding at least two blocks of pixels in the received source image that at least closely match may include starting from a first block of pixels in the received source image and predicting where a second at least closely matching block of pixels is in the received source image based on depth data of the first block of pixels from the depth data image. In this way, not all blocks between the first and second blocks needs to be checked, which may speed up detecting the repetitive pattern and lower the need of processing power and memory. Namely, the depth data of the first block of pixels may include a distance in meters corresponding to a distance in pixels in the received source image, wherein the block matching jumps straight to said distance in pixels away from the first block of pixels to find the second block of pixels. The prediction is particularly applicable to a detected repetitive pattern wherein the distance between repeated elements substantially corresponds to the disparity offset between the received source image and the one more source image, as discussed above.

The repetitive pattern may be selected from the group comprising: stripes, polygons (e.g. squares or rectangles), stars, and ellipses (e.g. circles, ovals).

The size of the area of the received source image and/or the depth data image may be up to 95% of the size of the received source image and/or the depth data image. Hence, relatively large artefacts can be handled.

The method may further comprise: deleting or adjusting the unreliable depth data. In this way, a depth data image without erroneous depth data caused by repetitive patterns in the surrounding environment can be provided.

The vehicle may be (automatically) controlled based on the depth data image in which the unreliable depth data is deleted or adjusted. For example, the vehicle could be manoeuvred correctly relative to a striped awning or a brick wall in the surrounding environment once the unreliable depth data caused by the striped awning or brick wall have been deleted or adjusted. Correct manoeuvring may for example include moving the vehicle closer to the striped awning or brick wall than was allowed based on the initial depth data image, or avoiding that the vehicle takes evasive action with respect to the striped awning or brick wall as the striped awning or brick wall may have appeared closer in the initial depth data image than what it actually is.

In one embodiment, the vehicle is an unmanned aerial vehicle (UAV), commonly known as a drone. The UAV could be at least partly autonomous.

In another embodiment, the vehicle is an at least partly autonomous road vehicle, such as a car or a truck or a bus. Here the present invention could be implemented in an automatic braking system of the vehicle, to for example avoid that the vehicle emergency brakes (too early) because of an object that has a repetitive pattern and hence may appear closer in the initial depth data image than what it actually is.

According to a second aspect of the present invention, there is provided a computer program product comprising computer program code to perform, when executed on a computer, the steps of: receiving a source image of a surrounding environment of a vehicle, which source image is captured by a sensor unit of the vehicle; receiving or computing a depth data image comprising depth data based on the source image and at least one more source image; detecting a repetitive pattern in the received source image; and based on the detection of the repetitive pattern, determining that an area of the depth data image, which area corresponds to an area of the detected repetitive pattern in the received source image, contains unreliable depth data. The computer program product may be a non-transitory computer program product. The computer may for example be a computer (device) of the vehicle. This aspect may exhibit the same or similar features and technical effects as the first aspect, and vice versa.

According to a third aspect of the present invention, there is provided a computer-readable storage medium comprising the computer program product according to the second aspect.

According to a fourth aspect of the present invention, there is provided an electrical signal embodied on a carrier wave and propagated on an electrical medium, the electrical signal comprising the computer program product according to the second aspect.

According to a fifth aspect of the present invention, there is provided a sensor rig for improving the interpretation of the surroundings of a vehicle, wherein the sensor rig comprises: a sensor unit adapted to capture a source image of a surrounding environment of the vehicle; and a computer device configured to: receive the source image from the sensor unit; receive or compute a depth data image comprising depth data based on the source image and at least one more source image from the sensor unit; detect a repetitive pattern in the received source image; and based on the detection of the repetitive pattern, determine that an area of the depth data image, which area corresponds to an area of the detected repetitive pattern in the received source image, contains unreliable depth data. This aspect may exhibit the same or similar features and technical effects any of the previous aspects, and vice versa.

According to a sixth aspect of the present invention, there is provided a vehicle comprising a sensor rig according the fifth aspect. This aspect may exhibit the same or similar features and technical effects any of the previous aspects, and vice versa.

BRIEF DESCRIPTION OF THE DRAWINGS

These and other aspects of the present invention will now be described in more detail, with reference to the appended drawings showing a currently preferred embodiment of the invention.

DETAILED DESCRIPTION

Figure 1:
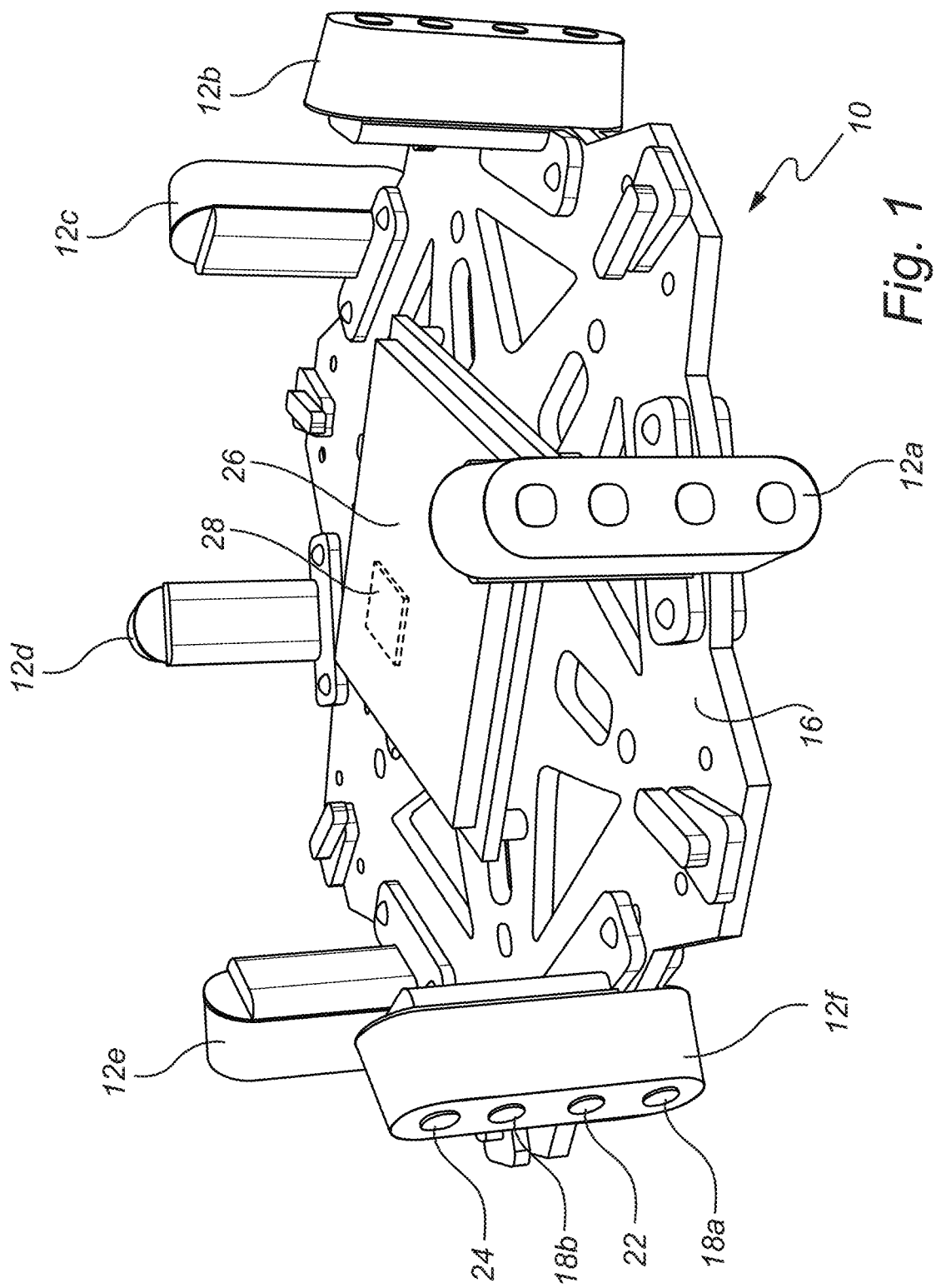
FIG. 1 is a perspective view of an exemplary embodiment of a sensor rig according to an aspect of the present invention.
Figure 2:
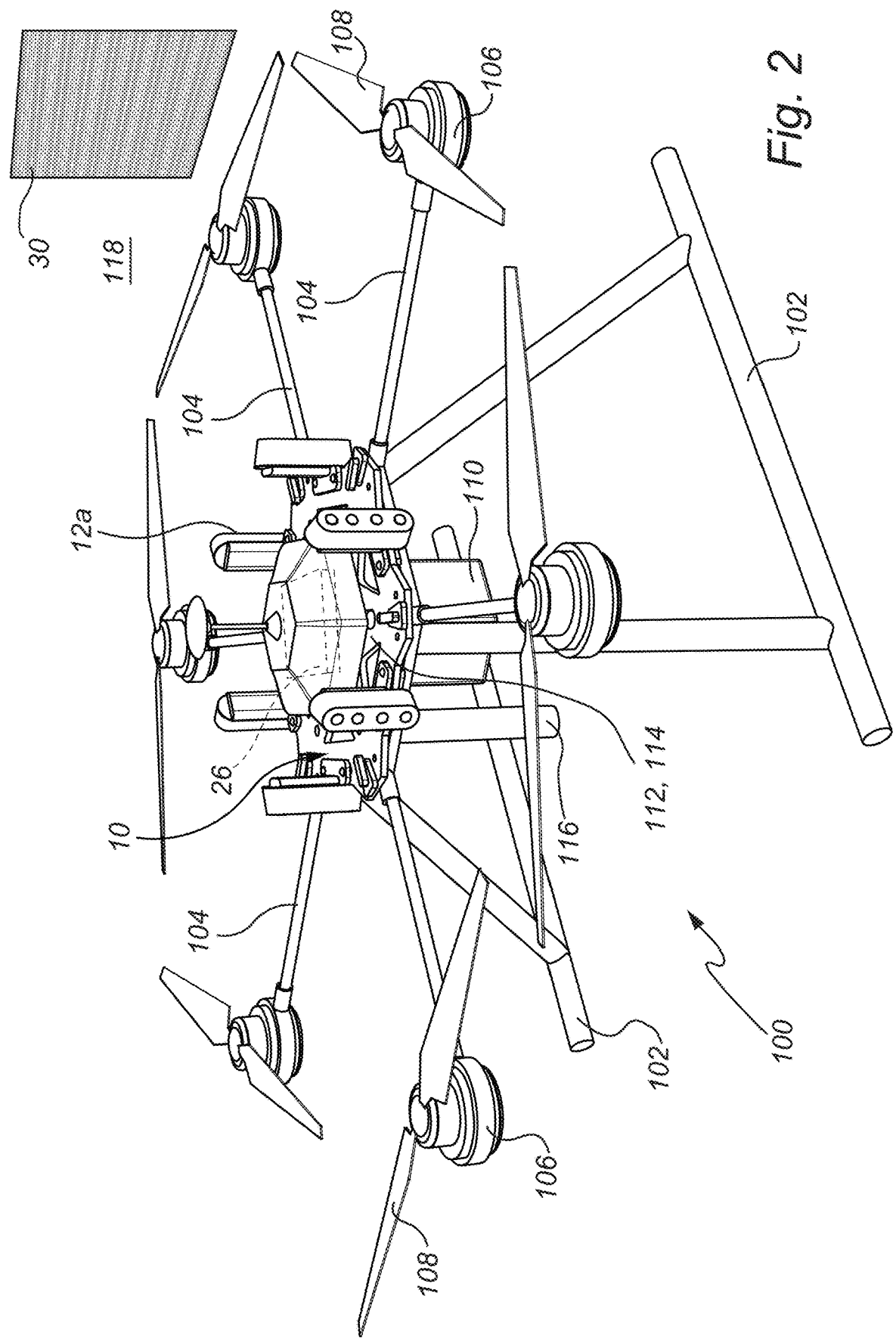
FIG. 2 is a perspective view of an exemplary embodiment of a vehicle, namely a UAV, according to an aspect of the present invention, which UAV comprises the sensor rig of FIG. 1.

FIG. 1 shows an exemplary embodiment of a sensor rig 10 according to the fifth aspect of the present invention, and FIG. 2 shows an exemplary embodiment of an (at least partly) autonomous UAV 100 according to the sixth aspect of the present invention.

The UAV 100 comprises the sensor rig 10. Apart from the sensor rig 10, the UAV 100 may comprise a pair of landing skids 102, a plurality of arms 104 each provided with a(n electric) motor 106 connected to a propeller 108, a battery pack 110 for powering (among other things) the sensor rig 10 and the motors 106, a flight controller 112, a GPS unit 114, and a downwards facing camera/sensor unit 116 for landing.

Turning to the sensor rig 10, the sensor rig 10 comprises at least one sensor unit, here six sensor units 12a-f. Each sensor unit 12a-f is adapted to capture a source image 14 (FIG. 4a) of a surrounding environment 118 of the UAV 100. The sensor units 12a-f are mounted to a support 16 of the sensor rig 10. The sensor units 12a-f are evenly spaced apart along the circumference of the support 16, and angularly offset in relation to each other, so that they together may offer a 360 degrees view of the surrounding environment 118.

Each sensor unit 12a-f may comprise two side-facing spaced-apart IR (infrared) cameras 18a-b. The aforementioned source image 14 may be captured by the first camera 18a of the two side-facing spaced-apart IR cameras 18a-b, and one more source image of the surrounding environment 118 may be captured by the second camera 18b of the two side-facing spaced-apart IR cameras 18a-b, resulting in two offset two-dimensional IR images. Here, the first and second cameras 18a-b are vertically spaced apart, and the two two-dimensional IR images are likewise vertically offset. Each sensor unit 12a-f may further be configured to compute a depth data image 20 (FIG. 4b) comprising depth data based on the source image 14 from the first camera 16a and one more source image from the second camera 16b ("stereo vision").

Each sensor unit 12a-f may further comprise an IR projector 22. The IR projector 22 may be used to illuminate the surrounding environment 118 to enable or facilitate provision of the depth data image. Each sensor unit 12a-f may further comprise an RGB camera 24. The sensor units 12a-f may for example be Intel RealSense Depth Camera D435.

The sensor rig 10 further comprises a computer device 26. The computer device 26 may for example be based on an Intel NUC board. The computer device 26 may be mounted to the support 16. The computer device 26 is connected to the sensor units 12a-f. The computer device 26 may be configured to perform various specific steps or actions detailed in the following by means of hardware or software (computer program product) 28 or a combination thereof. Any software 28 may run or be executed on the computer device 26 using a processor and a memory of the computer device 24. The computer device 26 may be connected to the flight controller 112. In another embodiment, the computer device 26 could be integrated in the flight controller 112.

Figure 3:
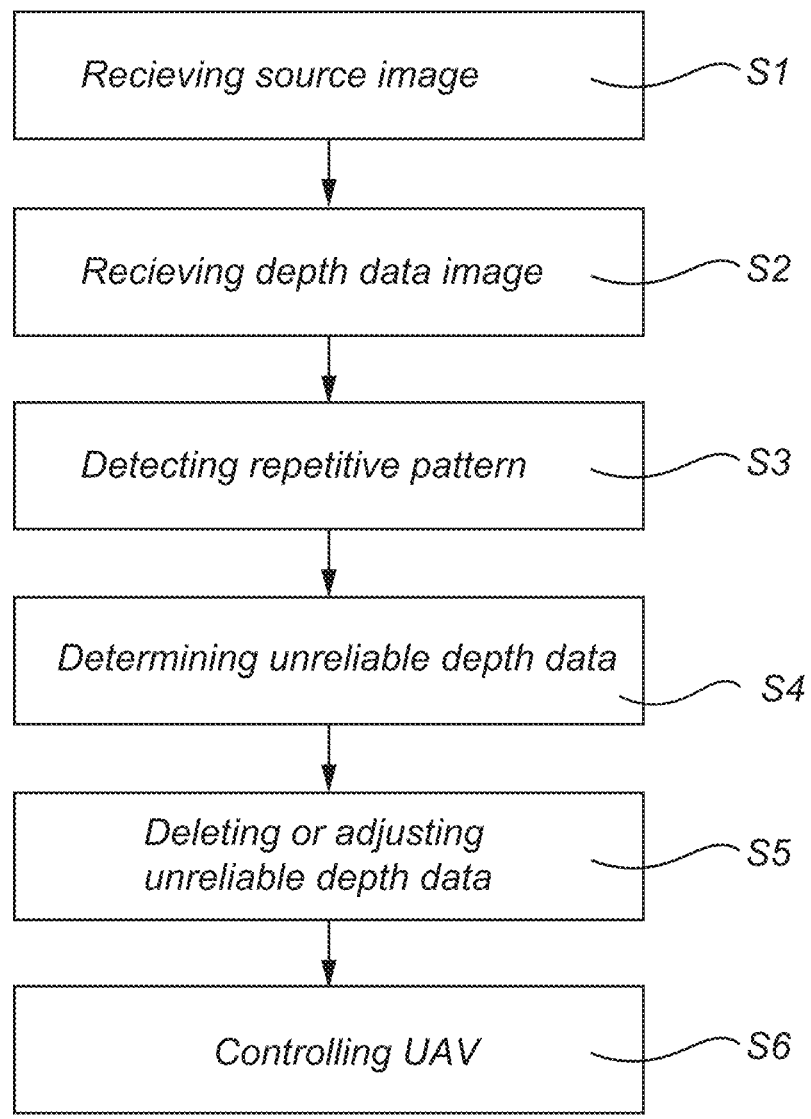
FIG. 3 is a flowchart of an exemplary embodiment of a method to an aspect of the present invention.

A method for improving the interpretation of the surroundings of the UAV 100, which method may be at least partly performed by the computer device 26 and hence correspond to operation of the computer device 26, will be described in the following with further reference to FIGS. 3-5.

At S1, the method comprises receiving the source image 14 of the surrounding environment 118 of the UAV 100, which source image 14 is captured by the first camera 18a of one of the sensor units 12a-f of the UAV 100, here sensor unit 12a.

At S2, the method comprises receiving the depth data image 20 from the sensor unit 12a. The depth data image 20 comprises depth data based on the source image 14 and one more source image captured by the second camera 18b of the sensor unit 12a.

At S3, the method comprises detecting a repetitive pattern 30 in the received source image 14. The repetitive pattern 30 is here vertically "stacked" horizontal stripes, but it could alternatively include polygons, stars, ellipses, etc. The repetitive pattern 30 is hence repetitive along a direction (vertical) which corresponds to the offset direction (vertical) of the source image 14 and the one more source image captured by the second camera 18b.

Figure 4A:
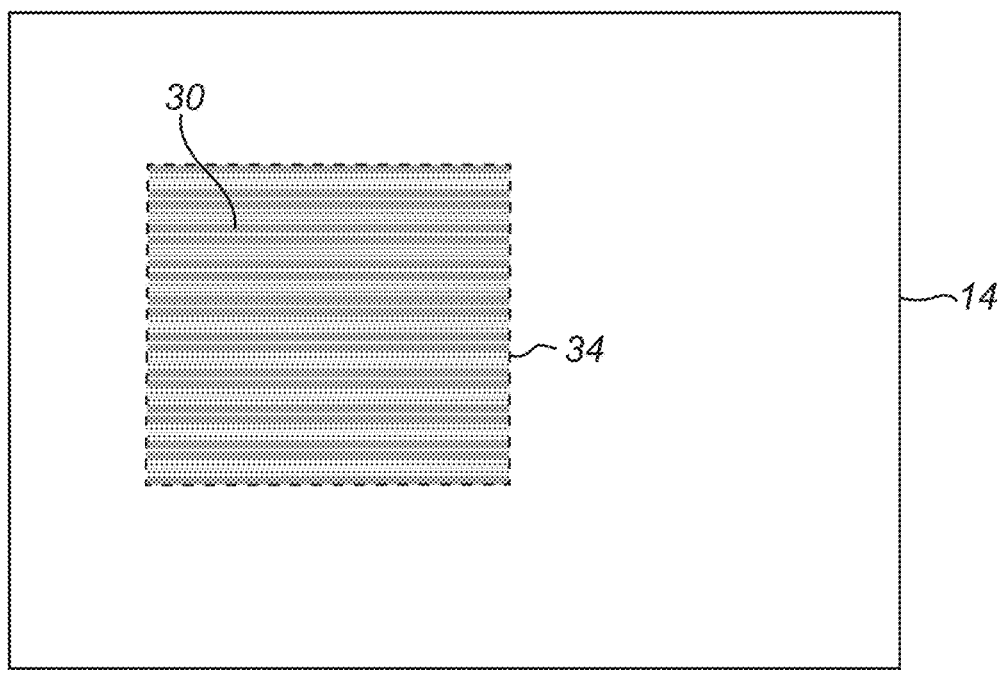
FIG. 4a is a schematic representation of a received source image.
Figure 4B:
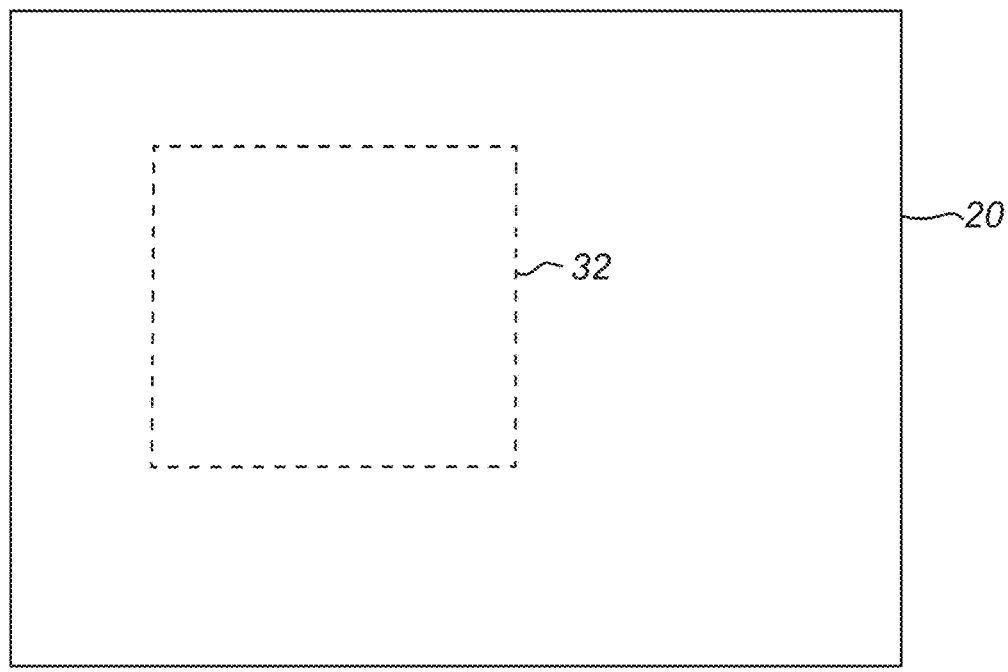
FIG. 4b is a schematic representation of a depth data image.

At S4, based on the detection of the repetitive pattern 30 in the received source image 14, the method determines that an area 32 of the depth data image, which area 32 corresponds to an area 34 of the detected repetitive pattern 30 in the received source image 14, contains unreliable depth data. In other words, the method may determine that certain depth data in the depth data image 20 are unreliable if their position in the depth data image 20 coincide with the detected repetitive pattern 30 in the received source image 14, as shown in FIGS. 4a-b. Stated otherwise, the method looks for a (certain) repetitive pattern 30 in the received source image 14, and if (such) a repetitive pattern is found the corresponding depth data of the depth data image 20 are deemed unreliable. No other finding than that the depth data in area 32 originates from the repetitive pattern 30 may be needed to determine that they are unreliable.

The area 32 may have the same or substantially the same size, shape, and position in the depth data image 20 as the area 34 has in the received source image 14. The area 34 can be found by boundary tracing of the repetitive pattern 30.

Figure 5:
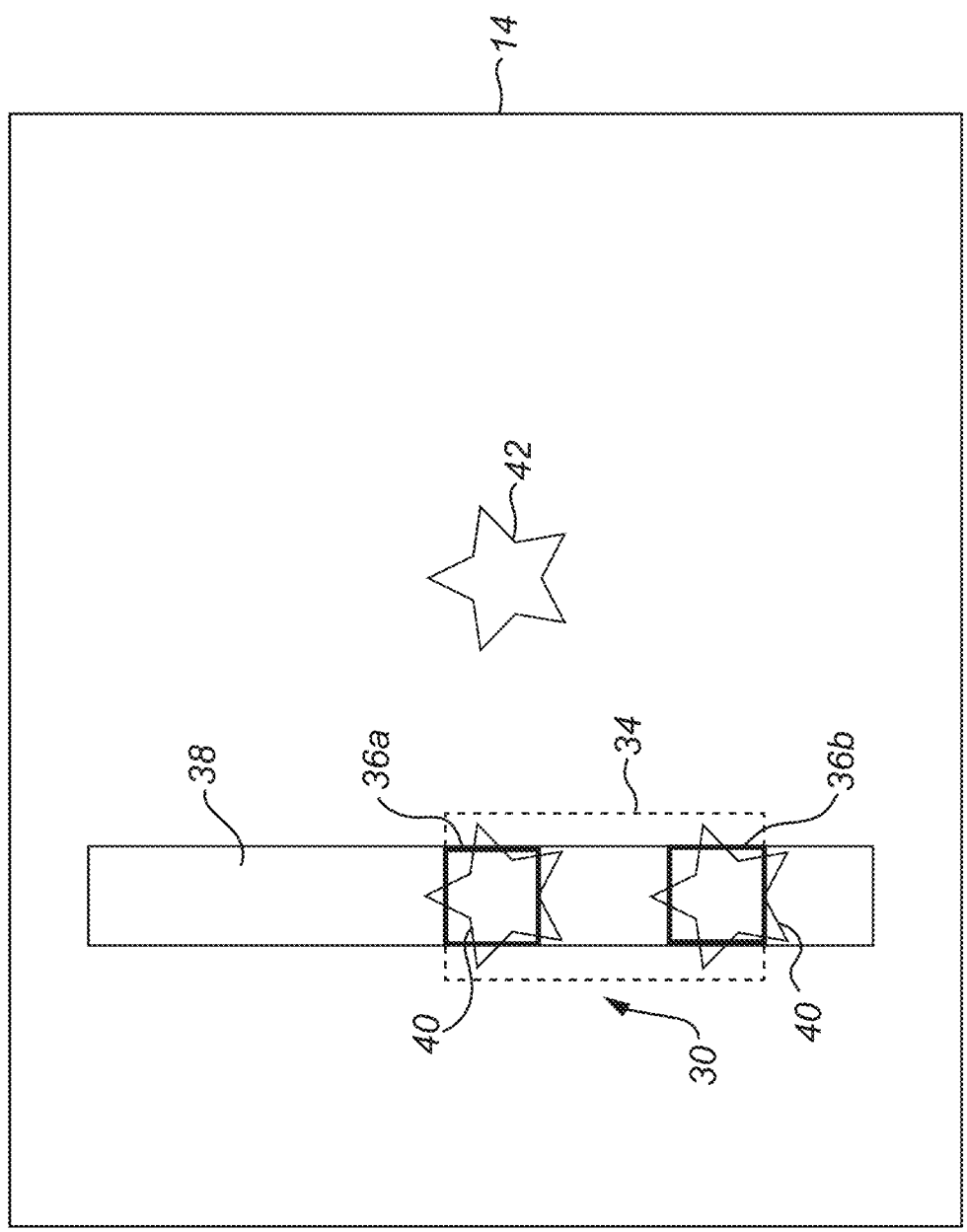
FIG. 5 illustrates block matching in a received source image.
Figure 5:
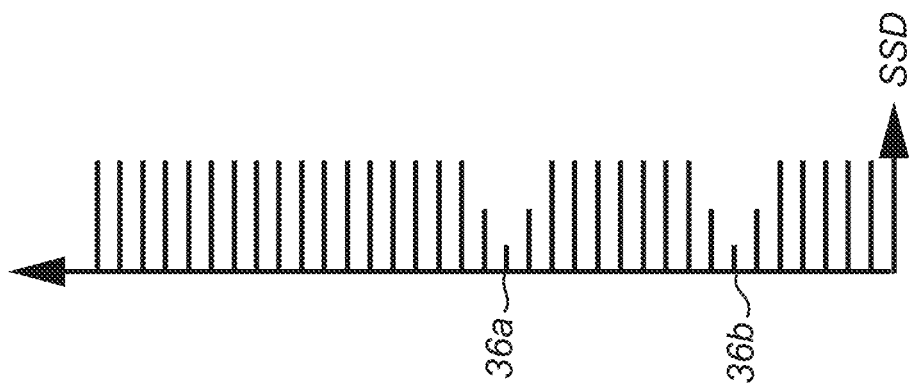

Detecting the repetitive pattern 30 in the received source image 14 may include performing block matching in the received source image 14, see FIG. 5 wherein the repetitive pattern 30 comprises a plurality of stars. The block matching may start with a first block 36a, which here is square or rectangular and contains a number of pixels, e.g. 2×2 or 5×5 pixels. The block matching may then for example search upwards and downwards from block 36a in the same image 14 as indicated by region 38 to find any (second) block 36b that at least closely matches the block 36a. The region 38 may have the same width as the first block 36a, for example 2 or 5 pixels. The height of region 38 could be 5-15%, for example about 10%, of the height of the source image 14.

The two blocks of pixels 36a-b in the received source image 14 may for example be matched using a sum of squared differences (SSD) method. To the left of image 14 in FIG. 5 there is shown the sum of squared differences for blocks of pixels in the region 38, and the low sums of squared differences at 36a and 36b indicate a match. That the two blocks 36a-b 'match' or 'at least closely' match may be construed as the sums of squared differences (SSD values) for these blocks are below a predetermined threshold.

Furthermore, finding the two blocks 36a-b of pixels may include predicting where the second block 36b of pixels is in the received source image 14 based on depth data of the first block 36a of pixels from the depth data image 20, so that not all blocks in the region 38 needs to be checked. For example, the depth data of the first block 36a of pixels may be 4 meters. "Reversed computation" (compared to stereo vision) may then yield that a similar block is say 15 pixels (vertically) away from the first block 36a, whereby the block matching may jump straight to 15 pixels (vertically) away from the first block 36a to find the second block 36b. This prediction is particularly applicable when the distance in pixels between repeated elements (stars 40) of the imaged repetitive pattern 30 substantially corresponds to the disparity offset in pixels between the received source image 14 and the one more source image.

The field of view (e.g. 90 degrees) of the first and second cameras 18a-b, the size (height) in pixels the source image 14, and the distance between the first and second cameras 18a-b could be used as input in the aforementioned reversed computation.

It is noted that the upper right star 42 shown in FIG. 5 should not be included in the area 34 because it does not form a pattern with the other stars that is repetitive in the vertical direction.

Returning to FIG. 3, the method may further comprise at S5 deleting or adjusting the unreliable depth data. Deleting or adjusting the unreliable depth data may include nullifying the depth data of the pixels in the area 32 of the depth data image 20. The remaining depth data of the depth data image 20 may be considered very reliable.

The UAV 100 may be controlled (S6) based on the depth data image in which the unreliable depth data are deleted or adjusted. For example, the UAV 100 could be manoeuvred automatically and correctly relative to awning with strips (repetitive pattern 30) in the surrounding environment 118 once the unreliable depth data caused by the repetitive pattern 30 have been deleted or adjusted. Correct manoeuvring may for example include flying the UAV 100 closer to the awning than was allowed based on the initial depth data image, or avoiding that the UAV 100 takes evasive action with respect to the awning as the awning may have appeared closer in the initial depth data image than what it actually is. The control in S6 may be effectuated by the flight controller 112 of the UAV 100 based on an input signal from the computer device 26, which input signal in turn is based on the depth data image 20 in which the unreliable depth data are deleted or adjusted.

The person skilled in the art realizes that the present invention by no means is limited to the embodiments described above. On the contrary, many modifications and variations are possible within the scope of the appended claims.

For example, in case of laterally/horizontally spaced apart cameras 18a-b, the block matching could search to the left and right from block 36a, to detect a repetitive pattern with e.g. vertical stripes.

The invention claimed is:

1. A computer-implemented method, wherein the method comprises:
   receiving a source image of a surrounding environment of a vehicle, which source image is captured by a sensor unit of the vehicle;
   receiving or computing a depth data image comprising depth data based on the source image and at least one more source image;
   detecting a repetitive pattern in the received source image; and
   based on the detection of the repetitive pattern, determining that an area of the depth data image, which area corresponds to an area of the detected repetitive pattern in the received source image, contains unreliable depth data,
   wherein detecting a repetitive pattern in the received source image includes performing block matching in the received source image,
   wherein performing block matching in the received source image includes finding at least two blocks of pixels in the received source image that at least closely match,
   and wherein finding at least two blocks of pixels in the received source image that at least closely match includes starting from a first block of pixels in the received source image and predicting where a second at least closely matching block of pixels is in the received source image based on depth data of the first block of pixels from the depth data image.

2. The method according to claim 1, wherein the repetitive pattern is repetitive along a direction which corresponds to an offset direction of said received source image and said at least one more source image.

3. The method according to claim 1, wherein a distance between repeated elements of the repetitive pattern as imaged in the received source image substantially corresponds to a disparity offset between the received source image and the one more source image.

4. The method according to claim 1, wherein at least two blocks of pixels in the received source image are matched using a sum of squared differences, SSD, method.

5. The method according to claim 1, wherein the depth data of the first block of pixels includes a distance in meters corresponding to a distance in pixels in the received source image, and wherein the block matching jumps straight to said distance in pixels away from the first block of pixels to find the second at least closely matching block of pixels.

6. The method according to claim 1, wherein the repetitive pattern is selected from the group comprising: stripes, polygons, stars, and ellipses.

7. The method according to claim 1, wherein a size of said area of the depth data image is up to 95% of a size of the depth data image.

8. The method according to claim 1, wherein a size of said area of the received source image is up to 95% of a size of the received source image.

9. The method according to claim 1, further comprising: deleting or adjusting the unreliable depth data.

10. The method according to claim 9, wherein the vehicle is controlled based on the depth data image in which the unreliable depth data is deleted or adjusted.

11. The method according to claim 1, wherein the vehicle is an unmanned aerial vehicle, UAV.

12. The method according to claim 1, wherein the vehicle is an at least partly autonomous road vehicle.

13. A non-transitory computer program product comprising computer program code to perform, when executed on a computer, the steps of:
   receiving a source image of a surrounding environment of a vehicle, which source image is captured by a sensor unit of the vehicle;
   receiving or computing a depth data image comprising depth data based on the source image and at least one more source image;
   detecting a repetitive pattern in the received source image; and
   based on the detection of the repetitive pattern, determining that an area of the depth data image, which area corresponds to an area of the detected repetitive pattern in the received source image, contains unreliable depth data,
   wherein detecting a repetitive pattern in the received source image includes performing block matching in the received source image,
   wherein performing block matching in the received source image includes finding at least two blocks of pixels in the received source image that at least closely match,
   and wherein finding at least two blocks of pixels in the received source image that at least closely match includes starting from a first block of pixels in the received source image and predicting where a second at least closely matching block of pixels is in the received source image based on depth data of the first block of pixels from the depth data image.

14. The non-transitory computer program product according to claim 13, wherein the repetitive pattern is repetitive along a direction which corresponds to an offset direction of said received source image and said at least one more source image.

15. The non-transitory computer program product according to claim 13, wherein a distance between repeated elements of the repetitive pattern as imaged in the received source image substantially corresponds to a disparity offset between the received source image and the one more source image.

16. The non-transitory computer program product according to claim 13, wherein the depth data of the first block of pixels includes a distance in meters corresponding to a distance in pixels in the received source image, and wherein the block matching jumps straight to said distance in pixels away from the first block of pixels to find the second at least closely matching block of pixels.

17. A sensor rig for improving interpretation of surroundings of a vehicle, wherein the sensor rig comprises:
   a sensor unit adapted to capture a source image of a surrounding environment of the vehicle; and
   a computer device configured to:
     receive the source image from the sensor unit;
     receive or compute a depth data image comprising depth data based on the source image and at least one more source image from the sensor unit;
     detect a repetitive pattern in the received source image by performing block matching in the received source image,
     wherein performing block matching in the received source image includes finding at least two blocks of pixels in the received source image that at least closely match, and wherein finding at least two blocks of pixels in the received source image that at least closely match includes starting from a first block of pixels in the received source image and predicting where a second at least closely matching block of pixels is in the received source image based on depth data of the first block of pixels from the depth data image; and
     based on the detection of the repetitive pattern, determine that an area of the depth data image, which area corresponds to an area of the detected repetitive pattern in the received source image, contains unreliable depth data.

18. A vehicle comprising a sensor rig according to claim 17.

19. The sensor rig according to claim 17, wherein the repetitive pattern is repetitive along a direction which corresponds to an offset direction of said received source image and said at least one more source image.

20. The sensor rig according to claim 17, wherein a distance between repeated elements of the repetitive pattern as imaged in the received source image substantially corresponds to a disparity offset between the received source image and the one more source image.

* * * * *